United States Patent
Wulff

(10) Patent No.: US 10,438,470 B2
(45) Date of Patent: Oct. 8, 2019

(54) SYSTEM FOR AND METHOD OF DETERRING THEFT OF ITEMS FROM A VENUE

(71) Applicant: SYMBOL TECHNOLOGIES, LLC, Lincolnshire, IL (US)

(72) Inventor: Thomas E. Wulff, Brookhaven, NY (US)

(73) Assignee: Symbol Technologies, LLC, Holtsville, NY (US)

(*) Notice: Subject to any disclaimer, the term of this patent is extended or adjusted under 35 U.S.C. 154(b) by 129 days.

(21) Appl. No.: 15/204,173

(22) Filed: Jul. 7, 2016

(65) Prior Publication Data
US 2018/0012466 A1    Jan. 11, 2018

(51) Int. Cl.
| | |
|---|---|
| H04N 7/18 | (2006.01) |
| H04N 9/47 | (2006.01) |
| G08B 13/24 | (2006.01) |
| G06K 7/10 | (2006.01) |
| G06K 19/077 | (2006.01) |
| G08B 13/196 | (2006.01) |
| G06K 19/07 | (2006.01) |

(52) U.S. Cl.
CPC ....... *G08B 13/246* (2013.01); *G06K 7/10009* (2013.01); *G06K 7/10336* (2013.01); *G06K 19/0723* (2013.01); *G06K 19/07758* (2013.01); *G08B 13/196* (2013.01); *G08B 13/248* (2013.01); *G08B 13/2417* (2013.01)

(58) Field of Classification Search
None
See application file for complete search history.

(56) References Cited

U.S. PATENT DOCUMENTS

| | | | |
|---|---|---|---|
| 4,656,463 A | | 4/1987 | Anders et al. |
| 5,710,540 A | * | 1/1998 | Clement .............. G07G 1/0054 340/5.9 |
| 5,745,036 A | | 4/1998 | Clare |
| 6,598,790 B1 | * | 7/2003 | Horst ................... G07G 1/0036 235/375 |
| 9,183,717 B1 | * | 11/2015 | Diorio ..................... G06Q 10/00 |
| 2011/0068906 A1 | | 3/2011 | Shafer et al. |
| 2016/0078264 A1 | * | 3/2016 | Armstrong ......... G08B 13/2417 340/572.1 |

FOREIGN PATENT DOCUMENTS

WO    2017/139484 A1    8/2017

OTHER PUBLICATIONS

Office Action for GB Patent Application No. 1710480.3 dated Dec. 20, 2017.

* cited by examiner

*Primary Examiner* — Talha M Nawaz
(74) *Attorney, Agent, or Firm* — Yuri Astvatsaturov

(57) ABSTRACT

Theft of an item from a department of a venue having a department-specific, point-of-sale (POS) station for completing a transaction of the item prior to authorized removal of the item from the department, is deterred by sensing and tracking movement of a target associated with the item from the department by deploying a plurality of sensing units overhead at the venue, and by generating an alert when the sensing units sense and track that the target associated with the item has bypassed the department-specific POS station without the transaction having been completed for the item at the department-specific POS station. Security personnel execute a theft-deterrent action in response to the alert.

10 Claims, 8 Drawing Sheets

SYSTEM FOR AND METHOD OF DETERRING THEFT OF ITEMS FROM A VENUE

BACKGROUND OF THE INVENTION

The present disclosure relates generally to a system for, and a method of, deterring theft of items that have bypassed a department-specific, point-of-sale (POS) station in a department of a venue, especially a retail venue.

Retail theft by customers and/or employees is a major problem facing retailers. To deter theft, retailers have, among other things, put up anti-shoplifting signs, installed security mirrors, and operated surveillance cameras, in their venues, and have also hired security personnel. Retailers, especially big-box, large-scale stores, have also subdivided their venues into individual departments, such as electronics, clothing, housewares, toys, etc., and grouped related items for sale in each department. Each department has one or more department-specific, point-of-sale (POS) stations to which a customer, who wishes to purchase and remove items from a respective department with authorization, is intended to go to complete a retail transaction for the items from that respective department by paying for the items. Such departments are distributed throughout the venue, typically away from one or more main POS stations that are located adjacent a main exit/entrance of the venue.

Experience has shown, however, that some customers will shop and remove items from a particular department, and then such customers, rather than paying for the items at the department-specific POS station designated for that particular department, will bypass that department-specific POS station, and sometimes continue their shopping in other departments. Most of these customers will pay for the items at the front of the venue at one of the main POS stations adjacent the main exit/entrance of the venue. However, some customers, especially shoplifters, will also bypass the main POS stations. Retail personnel situated in the departments at the back of the venue assume that the items removed from their departments will be paid for at the main POS stations at the front of the venue. Retail personnel situated at the main POS stations at the front of the venue assume that the items being removed from the venue were already paid for at one of the department-specific POS stations at the back of the venue. The result is that some shoppers simply walk the items right out of the main exit/entrance without paying for them and without being challenged due to such incorrect assumptions.

Accordingly, there is a need to deter theft of items that have bypassed a department-specific, point-of-sale (POS) station in a department of a venue.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
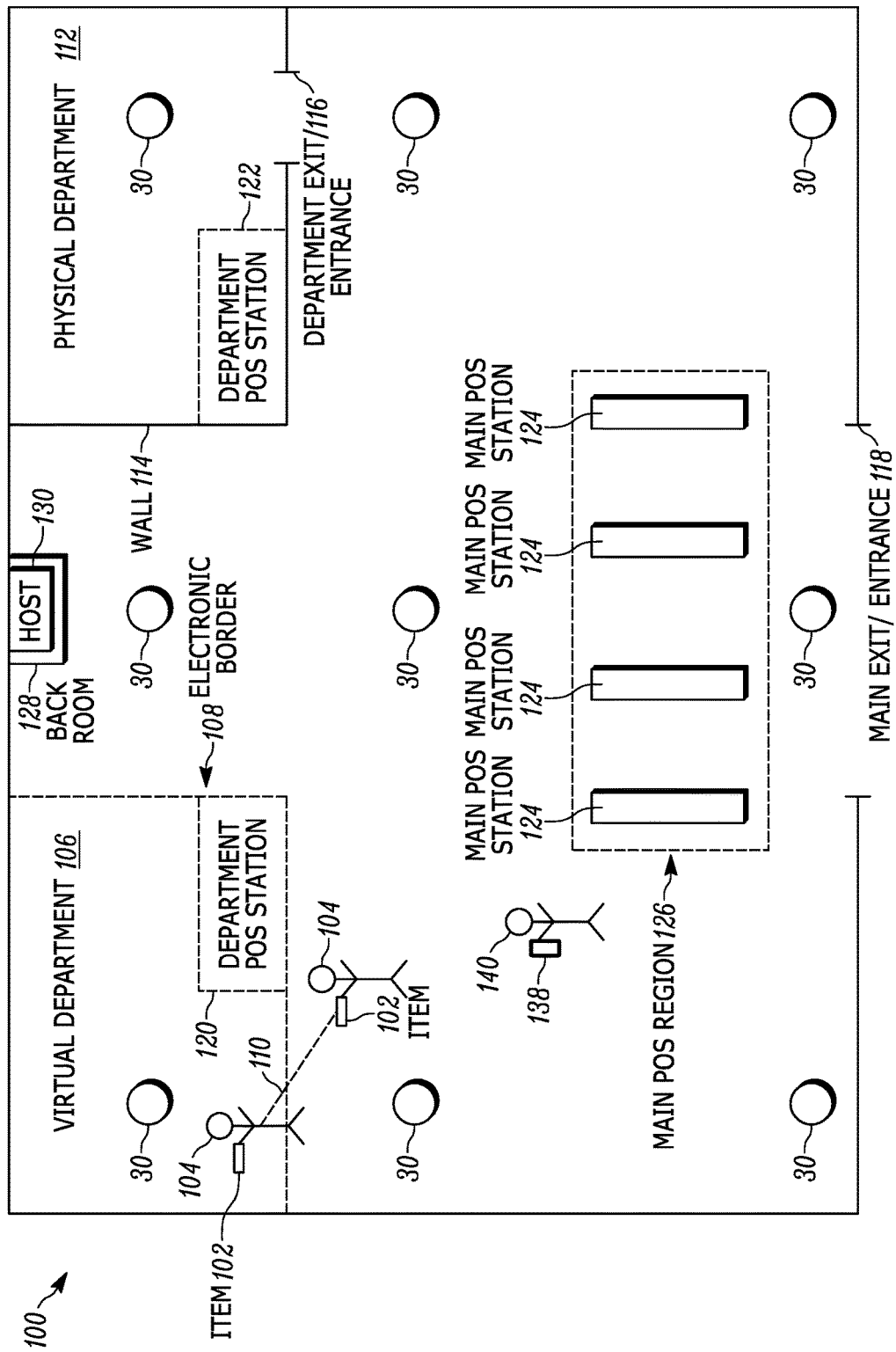
FIG. 1 is a schematic top plan view, as seen from above, of a system for deterring theft of retail items from a retail venue in which a plurality of overhead sensing units is deployed in accordance with the present disclosure.
Figure 2:
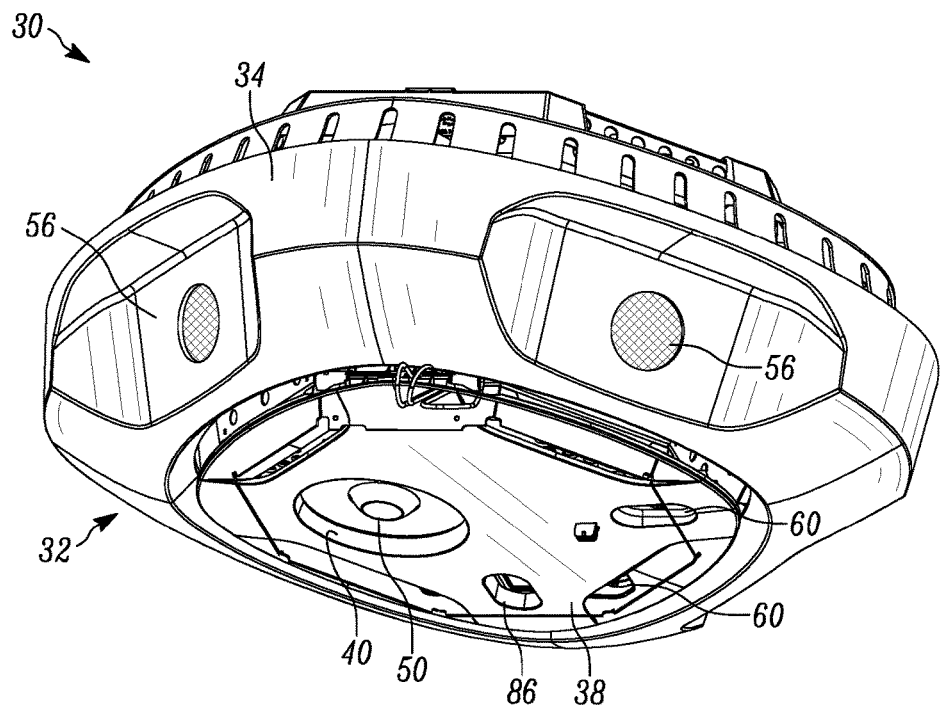
FIG. 2 is a perspective view, as seen from below, of a preferred embodiment of each sensing unit of FIG. 1.
Figure 3:
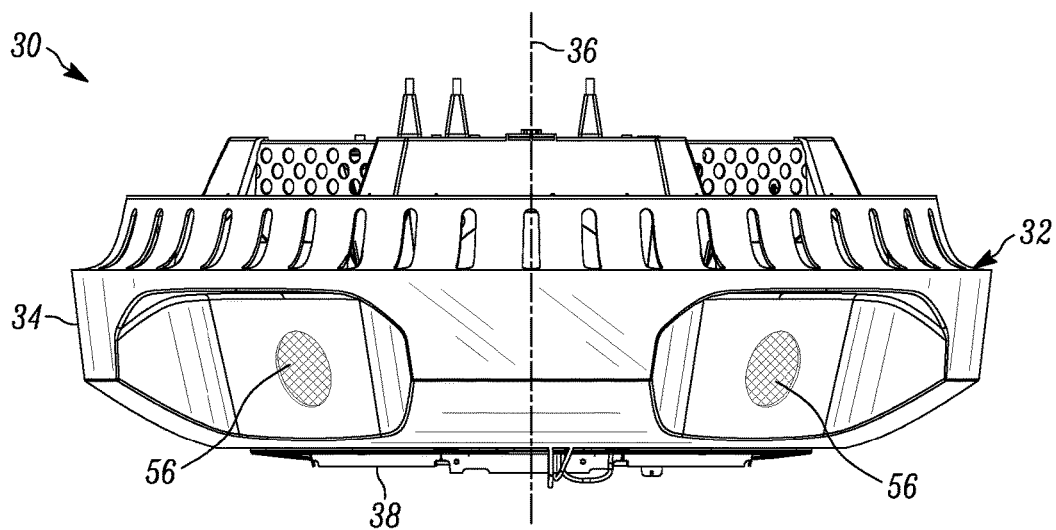
FIG. 3 is an elevational view of the unit of FIG. 2.

Skilled artisans will appreciate that elements in the figures are illustrated for simplicity and clarity and have not necessarily been drawn to scale. For example, the dimensions and locations of some of the elements in the figures may be exaggerated relative to other elements to help to improve understanding of embodiments of the present invention.

The system and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

One aspect of the present disclosure relates to a system for deterring theft of an item from a department of a venue having a department-specific, point-of-sale (POS) station for completing a transaction of the item prior to authorized removal of the item from the department. The system includes a plurality of sensing units deployed overhead at the venue, for sensing and tracking movement of a target associated with the item from the department. The system also includes a host server operatively connected to the department-specific POS station and the sensing units. The host server generates an alert when the sensing units sense and track that the target associated with the item has bypassed the department-specific POS station without the transaction having been completed for the item at the department-specific POS station.

Advantageously, each sensing unit includes a radio frequency (RF) identification (RFID) tag reader assembly for locating and tracking the target configured as an RFID tag over a coverage range that extends over an exit of the department, and/or a video assembly for capturing a video stream of images of the target over an imaging field of view that extends over the exit of the department, and/or a locationing assembly for ultrasonically locating the target for tracking the associated item during movement over a route that extends through the exit of the department. Preferably, the host server generates the alert as a visual and/or an audible signal. In a preferred embodiment, the host server wirelessly transmits the alert to a wireless receiver, such as a handheld smartphone, operated by security personnel authorized by the venue to execute a theft-deterrent procedure.

A method, in accordance with another aspect of the present disclosure, of deterring theft of an item from a department of a venue having a department-specific, point-of-sale (POS) station for completing a transaction of the item prior to authorized removal of the item from the department, is performed by sensing and tracking movement of a target associated with the item from the department by deploying a plurality of sensing units overhead at the venue. The method is further performed by generating an alert when the sensing units sense and track that the target associated with the item has bypassed the department-specific POS station without the transaction having been completed for the item at the department-specific POS station.

Turning now to the drawings, FIG. 1 schematically depicts, in top plan view, a system for deterring theft of items 102, especially retail items, by a shopper 104 from a retail venue 100. The venue 100 is subdivided into a plurality of individual departments, such as electronics, clothing, housewares, toys, etc. Related items 102 are grouped for sale in each department. One such department 106 is termed a virtual department in FIG. 1, because it is not enclosed by a physical wall, but by an invisible electronic border or fence 108. The shopper 104 may easily move into and out of the virtual department 106 through the electronic border 108 along a route 110, as represented by dashed lines in FIG. 1. Another such department 112 is termed a physical or real department in FIG. 1, because it is enclosed, at least partially, by a physical wall 114. The shopper 104 may easily move into and out of the physical department 112 through a department exit/entrance 116 (see also FIG. 8). The departments 106, 112 are illustrated as being situated at a rear or back of the venue 100, as considered in relation to a main exit/entrance 118 that is situated at a front of the venue 100. Although only two departments 106, 112 have been illustrated in FIG. 1, it will be understood that the venue may have a multitude of departments, both virtual or physical, and the departments may be distributed throughout the venue.

As also shown in FIG. 1, department 106 has one or more department-specific, point-of-sale (POS) stations 120, and department 112 has one or more department-specific POS stations 122. Each department-specific POS station 120, 122 has a workstation, such as a scanner, for scanning and processing each item, and a payment terminal, including a credit/debit card reader and a cash register, to process a payment for the processed item. The shopper 104, who wishes to purchase and remove items 102 from a respective department 106, 112 with authorization, is intended to go to the respective department-specific POS station 120, 122 to complete a retail transaction for the item 102 from that respective department 106, 112 by paying for the items 102.

As further shown in FIG. 1, one or more main or general POS stations 124 are located in a front or main POS region 126 adjacent the front or main exit/entrance 118 at the front of the venue 100. Each main POS station 124, like the department-specific POS stations 120, 122, is able to process and accept payment for the items 102. A host controller or network server 130 is operatively connected to all the POS stations 120, 122, 124 to control their operation. The host server 130 is preferably located in a backroom 128 that is situated away from the main POS region 126. The server 130 comprises one or more computers and may be in wired, wireless, direct, or networked communication with each POS station. The server 130 may also be a remote cloud server.

As previously explained, some shoppers 104 will shop and remove items 102 from a particular department, e.g., department 106, and then, rather than paying for the items 102 at the department-specific POS station 120 designated for that particular department 106, such shoppers 104 will move along route 110 and bypass the department-specific POS station 120, and sometimes continue their shopping in other departments, e.g., department 112. Most of these shoppers 104 will pay for the items 102 at the front main POS region 126 of the venue 100 at one of the main POS stations 124 adjacent the main exit/entrance 118 of the venue 100. However, some shoppers 104, especially shoplifters, will also bypass the main POS stations 124. Retail personnel situated in the departments 106, 112 at the back of the venue 100 assume that the items 102 removed from their departments 106, 112 will be paid for at the main POS stations 124 at the front main POS region 126 of the venue 100. Retail personnel situated at the main POS stations 124 at the front main POS region 126 assume that the items 102 being removed from the venue 100 were already paid for at one of the department-specific POS stations 106, 112 at the back of the venue 100. The result is that some shoppers 104 simply walk the items 102 right out of the main exit/entrance 118 without paying for them and without being challenged due to such incorrect assumptions. This disclosure is directed to deter theft of any items 102 that have bypassed a department-specific POS station 120, 122.

In accordance with this disclosure, a plurality of overhead sensing units 30 is deployed overhead at the venue 100. The sensing units 30 are operatively connected to, and controlled by, the host server 130 to sense and track movement of targets associated with the items 102 out of the departments 106, 112. Advantageously, the sensing units 30 are installed on, or adjacent to, the ceiling of the venue and are spaced apart every twenty to eighty feet or so in a grid, such as a square pattern as illustrated in FIG. 1. As described below, each such item is preferably tagged with a target configured as a radio frequency (RF) identification (RFID) tag, preferably a passive RFID tag for cost reasons.

A preferred embodiment of each sensing unit 30 is depicted in FIGS. 2-7. Each unit 30 has a generally circular, hollow, common housing 32 mounted at a single overhead location in a zone of the venue 100. Preferably, an upright, vertical post 80 extends downwardly from the ceiling, and a lower end of the post 80 is connected to an apertured plate or cage 82 that is attached to a bracket 84 that, in turn, is connected to the housing 32. The housing 32 has an outer wall 34 bounding an upright, vertical axis 36 and a bottom wall, which is configured as a hinged access door 38. The door 38 has a generally circular opening 40. The housing 32 supports a plurality of electrically-powered sensor modules operative for sensing and tracking targets associated with the items 102 in the venue 100.

Figure 6:
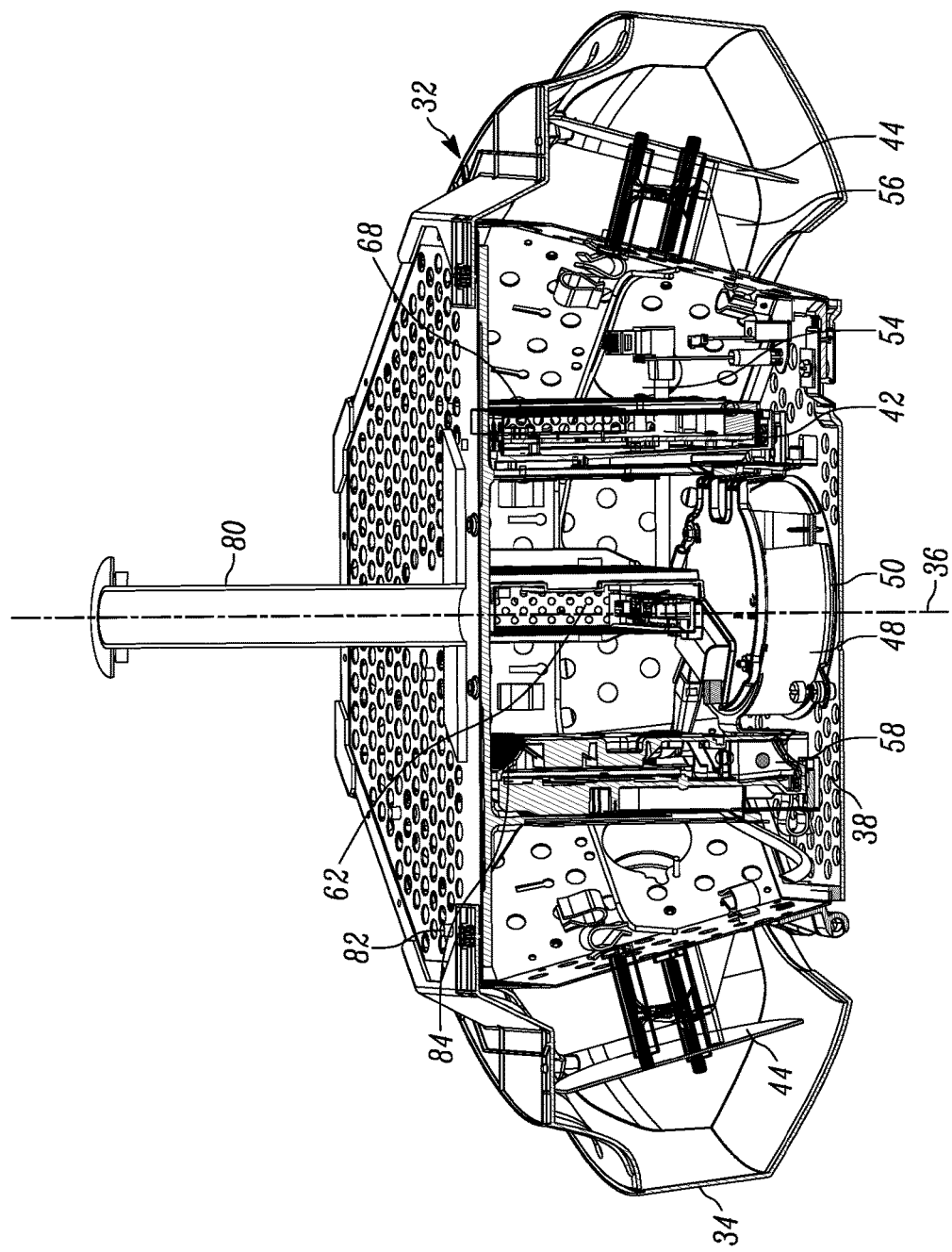
FIG. 6 is a broken-away, enlarged, sectional view of the unit of FIG. 2, and showing the interior of the unit.
Figure 7:
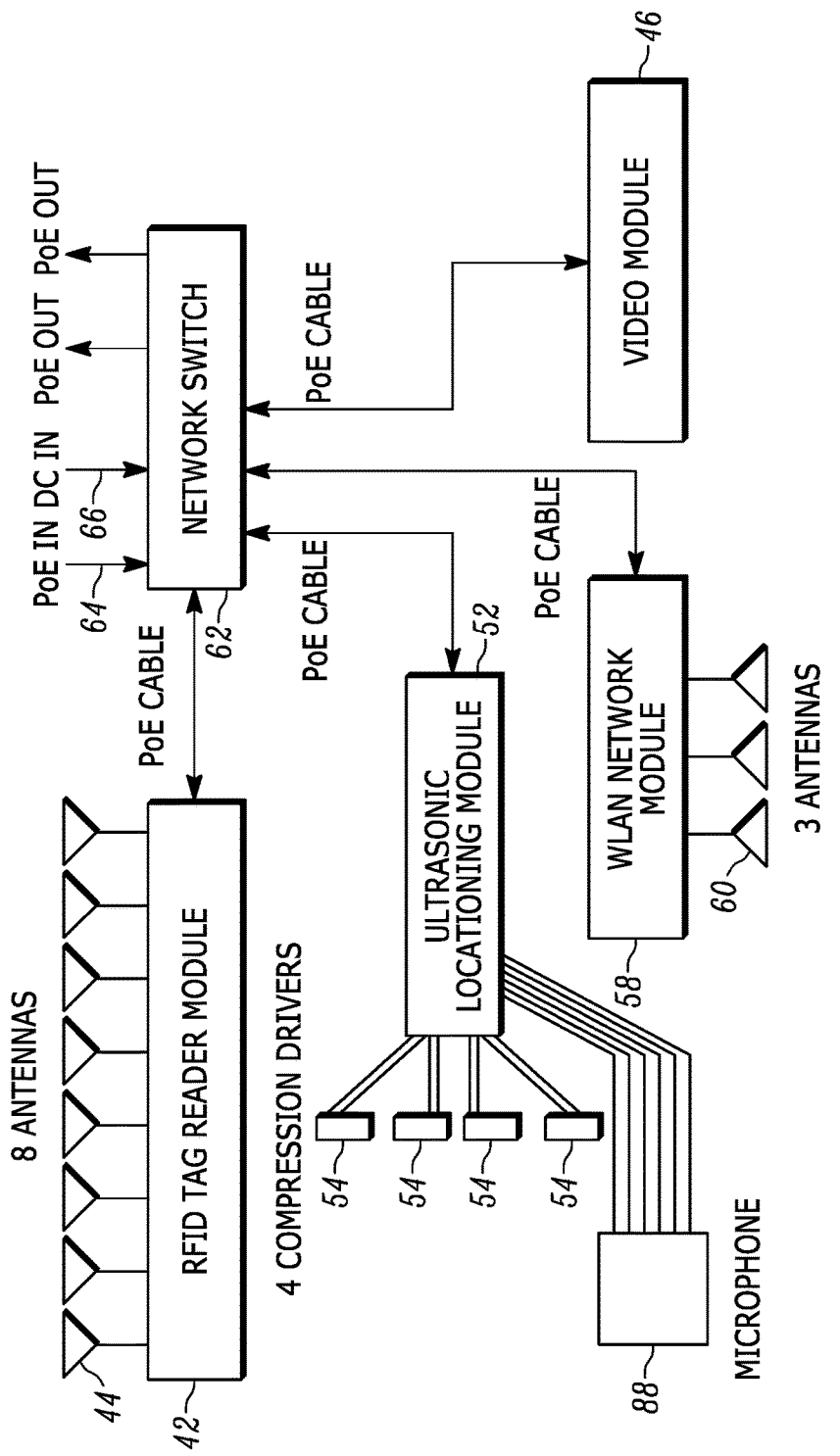
FIG. 7 is a block diagram showing the electrical connections among various built-in sensing assemblies mounted in the interior of the unit of FIG. 2.

As best shown in FIG. 7, one of the sensor modules is a component of an RFID reader assembly and constitutes an RFID tag reader module 42 that is interchangeably mounted within the housing 32, for reading targets configured as RFID tags in the venue 100 over a coverage range that extends over the exits of the departments 106, 112. The RFID module 42 includes control and processing electronics that are operatively connected to a plurality of RFID antennas 44, which are energized by the RFID module 42 in a firing order. The RFID module 42 includes an RF transceiver operated, under the control of the server 130, to form and steer an interrogating RF beam across, and interrogate and process the payloads of, any RFID tags that are in its coverage range. The RFID antennas 44 receive a return RF beam from the interrogated tag(s), and the RFID module 42 decodes an RF signal from the return RF beam, under the control of the server 130, into decoded data. The decoded data, also known as a payload or captured target data, can denote a serial number, a price, a date, a destination, a location, other attribute(s), or any combination of attributes, and so on, for the tagged item. As best shown in FIG. 6, the RFID antennas 44 are mounted inside the housing 32 and are arranged, preferably equiangularly spaced apart, about the upright axis 36. The outer wall 34 covers the RFID antennas 44 and acts as a radome to protect the RFID antennas 44. The outer wall 34, as well as the housing 32, is constituted of a material, such as plastic, through which RF signals can readily pass.

As also shown in FIG. 7, another of the sensor modules is a component of a video assembly and constitutes a video module 46 interchangeably mounted within the housing 32, and operatively connected to a camera 48, also mounted within the housing 32. The video module 46 includes camera control and processing electronics for capturing a video stream of images of targets over an imaging field of view that extends over the exits of the departments 106, 112. The targets can, for example, be the aforementioned RFID-tagged items, and can even be people, such as the shopper 104, under surveillance by the camera 48. The camera 48 has a lens 50 that faces, and is optically aligned with, the opening 40 in the access door 38. The camera 48 is advantageously a high-bandwidth, moving picture expert group (MPEG) compression camera.

As further shown in FIG. 7, still another of the sensor modules is a component of a locationing assembly and constitutes an ultrasonic locationing module 52 interchangeably mounted within the housing 32, for locating and tracking targets configured as mobile devices during movement over the route 110 that extends through exits of the departments 106, 112 in the venue 100 by transmitting and receiving ultrasonic energy between the ultrasonic locationing module 52 and the mobile devices. The mobile devices can be handheld RFID tag readers, handheld bar code symbol readers, smartphones, tablets, watches, computers, radios, or the like, each device being equipped with a transducer, such as a microphone. The mobile device can also be a shopping cart (see FIG. 8), or any like freight moving device, for moving the items 102. The locationing module 52 includes control and processing electronics operatively connected to a plurality of compression drivers 54 and, in turn, to a plurality of ultrasonic transmitters, such as voice coil or piezoelectric speakers 56. The ultrasonic speakers 56 are preferably mounted on the outer wall 34 and are arranged, preferably equiangularly spaced apart, about the upright axis 36. The ultrasonic speakers 56 are driven by the locationing module 52 in a drive order. A feedback microphone 88 may also be mounted on the outer wall 34.

As still further shown in FIG. 7, still another of the modules may be a component of a communications assembly and constitutes a wireless local area network (WLAN) communications module 58 interchangeably mounted within the housing 32, for wireless communication over a network at the venue 100. The communications module 58 includes control and processing electronics that are operatively connected to a plurality of WLAN antennas 60 that are mounted, and spaced apart, on the housing 32. The communications module 58 serves as a Wi-Fi access point for transmitting and receiving wireless communications throughout the venue 100. Wi-Fi is an available wireless standard for wirelessly exchanging data between electronic devices, thereby establishing a local area network in the venue.

Each ultrasonic speaker 56 periodically transmits ultrasonic ranging signals, preferably in short bursts or ultrasonic pulses, which are received by the microphone on the mobile device. The microphone determines when the ultrasonic ranging signals are received. The communications module 58 advises the ultrasonic locationing module 52 when the ultrasonic ranging signals were received. The locationing module 52, under the control of the server 130, directs all the speakers 56 to emit the ultrasonic ranging signals in the drive order such that the microphone on the mobile device will not receive overlapping ranging signals from the different speakers. The flight time difference between the transmit time that each ranging signal is transmitted and the receive time that each ranging signal is received, together with the known speed of each ranging signal, as well as the known and fixed locations and positions of the speakers 56 on each sensing unit 30, are all used to determine the position of the microphone mounted on the mobile device, and, in turn, the position of the mobile device, using a suitable locationing technique, such as triangulation, trilateration, multilateration, etc.

A power and data distribution system is employed for transmitting network control data and electrical power to the sensor modules 42, 46, 52, and for transmitting the captured target data away from the sensor modules 42, 46, 52. The power and data distribution system includes a networking control switch 62 mounted within the housing 32, an exterior power and data cable, preferably a Power-over-Ethernet (PoE) cable, connected between each unit 30 and the server 130, and a plurality of interior PoE cables each connected between a respective module 42, 46, 52, 58 and the networking control switch 62. Each PoE cable connected to the modules 42, 46, 52 transmits the electrical power and transmits the control data thereto from the networking control switch 62, and transmits the target data away from the respective module 42, 46, 52 to the networking control switch 62. The PoE cable connected to the communications module 58 transmits the electrical power and transmits the control data thereto from the networking control switch 62, and transmits communications data away from the communications module 58 back to the server 130. The exterior PoE cable is connected between a power source (not illustrated) and an input port 64 on the networking control switch 62. An optional DC power line 66 can be connected to the networking control switch 62.

Figure 4:
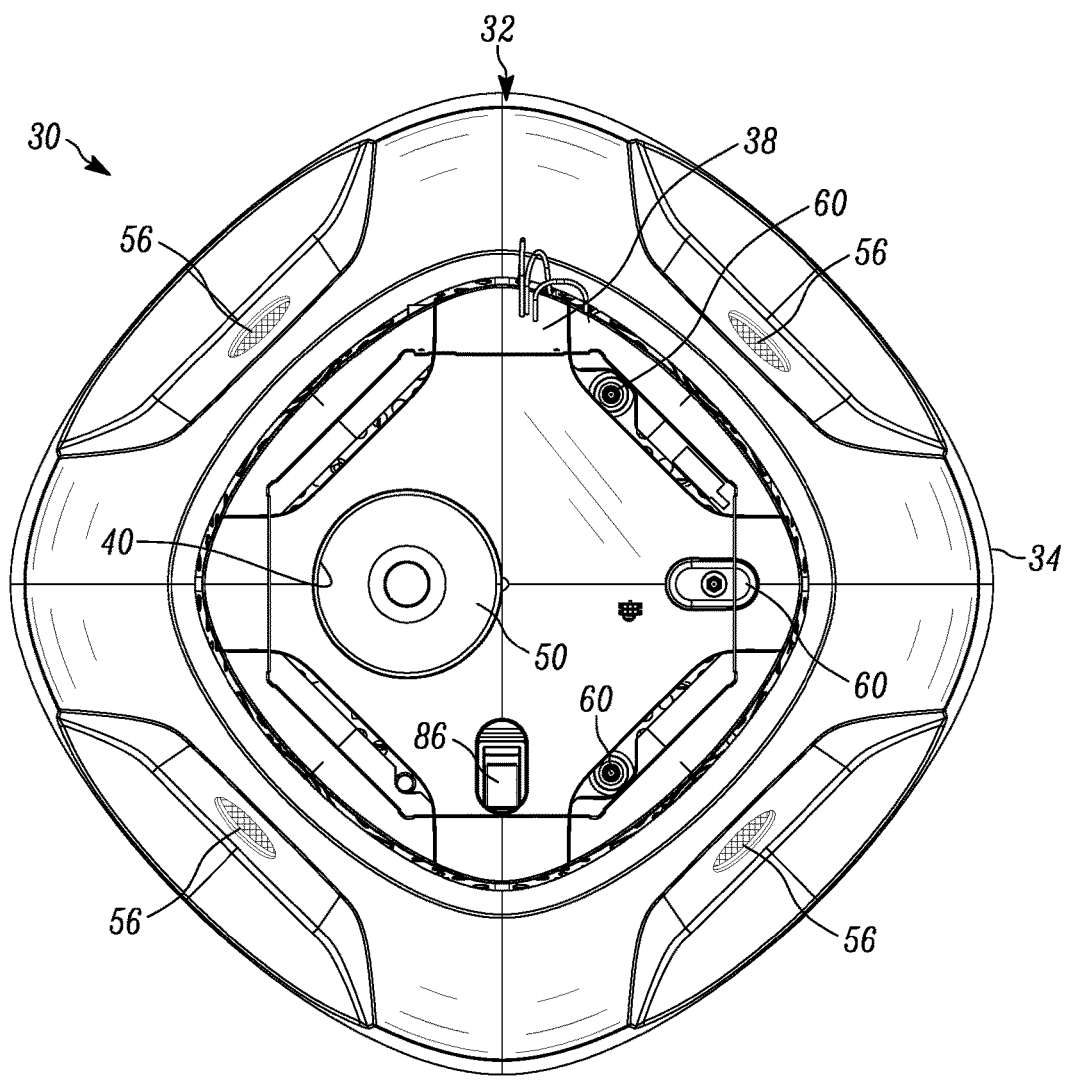
FIG. 4 is a bottom plan view of the unit of FIG. 2, and showing a bottom access door in a closed position.
Figure 5:
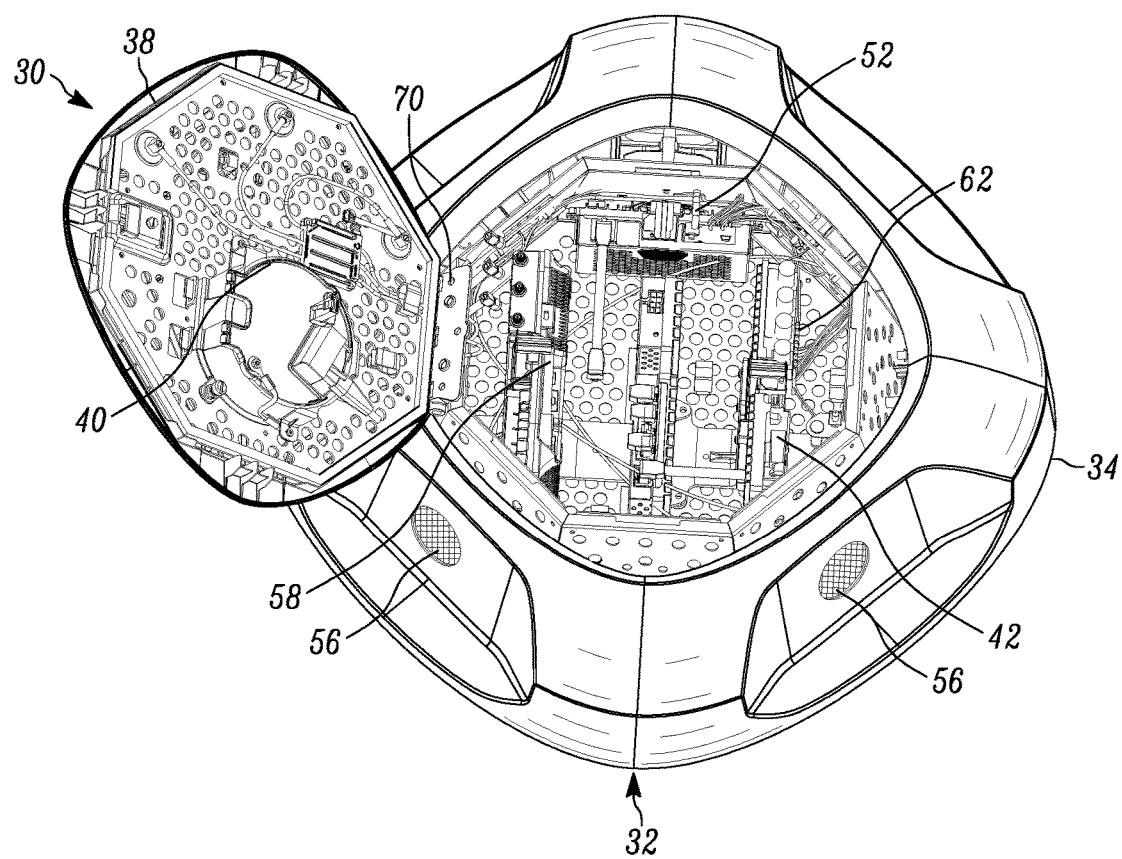
FIG. 5 is a perspective view of the unit of FIG. 2, and showing the bottom access door in an open position.

The aforementioned access door 38 is hinged at hinge 70 to the housing 32 for movement between an open position (FIG. 5) and a closed position (FIG. 4). A slide switch 86 is moved to unlock the access door 38. In the open position shown in FIG. 5, the modules 42, 52, 58 are all accessible to be installed in the housing 32, or to be removed from the housing 32 and replaced with another module for maintenance and repair.

In normal operation, the shopper 104 enters a department of the venue 100, e.g., the department 106, typically pushing a shopping cart (see FIG. 8), selects one or more items 102 to be purchased, carries or places the selected items 102 in the cart, and goes to the department-specific POS station 120 to complete the transaction, for example, by paying for the items 102. At this time, an employee removes and/or deactivates any RFID tags associated with the items 102. The server 130 registers each completed transaction at the department-specific POS station 120. The shopper 104 is now free to leave the venue 100 through the main exit/entrance 118.

Figure 8:
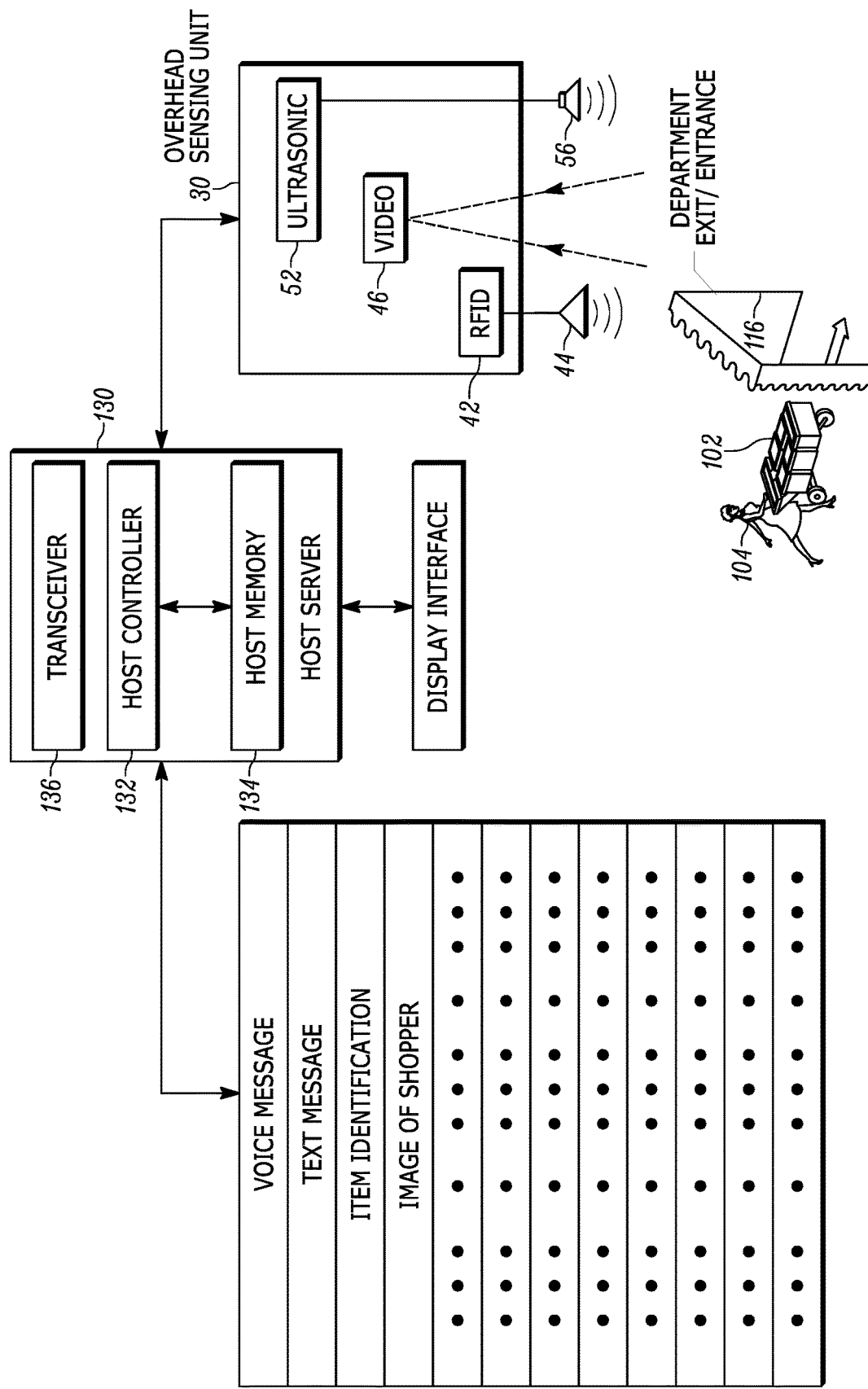
FIG. 8 is a block diagram of the unit of FIG. 2 and of a host server for generating various alerts when a possible theft is detected.

However, if the shopper 104 moves along route 110 and bypasses the department-specific POS station 120, as shown in FIGS. 1 and 8, then the sensing units 30, whose coverage range extends over the route 110, will sense the target, e.g., the RFID tag, associated with the item 102 that is passing along the route 110. This RFID tag was never removed or deactivated at the POS station 120 and, as a result, the removal of the associated item 102 from the department 106 is unauthorized. As shown in FIG. 8, the server 130 includes a host controller 132, a host memory 134, and a wireless RF transceiver 136 that wirelessly communicates with a corresponding wireless receiver, such as a smartphone 138 (see FIG. 1) operated and held by security personnel, such as a guard 140. The wireless communication can be performed by, for example, Wi-Fi and Bluetooth®, which are open wireless standards for exchanging data between electronic devices. The host memory 134 stores a map of the venue 100 in which the locations and boundaries of each department are mapped. The host controller 132 will generate an alert when the sensing units 30 sense and track that the target associated with the item 102 has bypassed the department-specific POS station 120 without the transaction having been completed for the item 102 at the department-specific POS station 120. The alert can be a visual and/or an audible signal generated, for example, onboard the overhead housing 32, or preferably, the alert can be sent to the smartphone 138 for action by the security personnel 140. As shown in FIG. 8, the alert can be a voice message, a text message, an identification of the bypassed item 102, an image of the shopper 104 carrying the bypassed item 102, etc.

As further shown in FIG. 8, each sensing unit 30 includes the above-described RFID tag reader assembly having the RFID reader module 42 and the RFID antenna elements 44 for locating and tracking the RFID tags over a coverage range that extends along the route 110 over an exit, e.g., 116, of the department 106. Thus, if the RFID tag reader assembly identifies an RFID tag outside the department 106, then the host controller 132 will generate the alert.

As also shown in FIG. 8, each sensing unit 30 further includes the above-described video assembly having the video module 42 with its camera 44 for capturing a video stream of images of the targets over an imaging field of view that extends along the route 110 over an exit, e.g., 116, of the department 106. Thus, if the video assembly identifies the item 102 outside the department 106, then the host controller 132 will generate the alert. The mounting of the camera 44 within the housing 32 is especially advantageous, because the camera 44 is substantially hidden from view.

As also shown in FIG. 8, each sensing unit 30 further includes the above-described locationing assembly having the locationing module 52 and speakers 56 for ultrasonically locating targets configured as mobile devices for moving the items 102 over the route 110. Thus, if the locationing assembly identifies a mobile device, such as the shopping cart of FIG. 8, that is moving the item 102 over the route 110 to a location past the exit, e.g., 116, outside the department 106, then the host controller 132 will generate the alert.

Each target can be located and tracked by an individual assembly, or preferably, at least two of the assemblies mutually cooperate with each other to accurately locate and track the targets. For example, the RFID assembly may determine the general location or neighborhood of the tag with a certain level of accuracy, and the video assembly may determine the location of the tag with a higher or finer level of accuracy by locating the shopper who is holding or moving the tag. As another example, the ultrasonic locationing assembly may determine the general location or neighborhood of the mobile device with a certain level of accuracy, and the communications assembly may determine the location of the mobile device with a higher or finer level of accuracy by advising the ultrasonic locationing module when the ultrasonic energy was actually received by the mobile device. As still another example, all the assemblies may cooperate with one other to locate the target with a high degree of precision.

Figure 9:
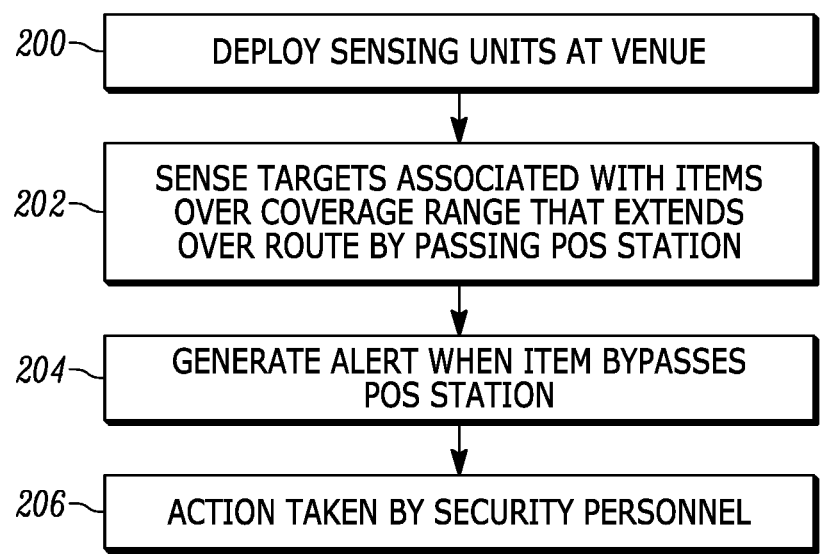
FIG. 9 is a flow chart of a method of deterring theft of retail items from a retail venue in accordance with the present disclosure.

As shown in the flow chart of FIG. 9, the method of this disclosure is performed by deploying the sensing units 30, in step 200, overhead at the venue 100, and by sensing and tracking targets associated with the items 102 over a coverage range that extends over the route 110 that bypasses the department-specific POS stations 120, 122, in step 202. In step 204, an alert is generated when the sensing units 30 sense that the targets associated with the items have bypassed the department-specific POS stations 120, 122 without the transaction having been completed for the items 102 at the department-specific POS stations 120, 122. In step 206, security personnel respond to the alert by taking various deterrent actions, for example, directing the shopper 104 to the main POS station 124 for checkout, stopping the shopper 104 from leaving the venue 100, or executing any theft-prevention procedures approved by the venue.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements, but may include other elements not expressly listed or inherent to such process, method, article, or apparatus. An element proceeded by "comprises . . . a," "has . . . a," "includes . . . a," or "contains . . . a," does not, without more constraints, preclude the existence of additional identical elements in the process, method, article, or apparatus that comprises, has, includes, or contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1%, and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors, and field programmable gate arrays (FPGAs), and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein, will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. A system for deterring theft of an item from a department of a venue having a department-specific, point-of-sale (POS) station for completing a transaction of the item prior to authorized removal of the item from the department, the system comprising:
 a plurality of sensing units deployed overhead at the venue, for sensing and tracking movement of a target associated with the item from the department; and
 a host server including a memory, the memory storing a map of the venue, the map including a location and a boundary of each a plurality of departments,
 the host server operatively connected to the department-specific POS station and the sensing units, for generating an alert when the sensing units sense and track that the target associated with the item has bypassed the department-specific POS station by passing through the boundary of the department without the transaction having been completed for the item at the department-specific POS station.

2. The system of claim 1, wherein each sensing unit includes a radio frequency (RF) identification (RFID) tag reader assembly for locating and tracking the target configured as an RFID tag over a coverage range that extends over an exit of the department.

3. The system of claim 1, wherein each sensing unit includes a video assembly for capturing a video stream of images of the target over an imaging field of view that extends over an exit of the department.

4. The system of claim 1, wherein each sensing unit includes a locationing assembly for ultrasonically locating the target for tracking the associated item during movement over a route that extends through an exit of the department.

5. The system of claim 1, wherein the host server is operative for generating the alert as at least one of a visual and an audible signal.

6. The system of claim 1, wherein the host server is operative for wirelessly transmitting the alert to a wireless receiver monitored by security personnel authorized to execute a theft-deterrent action.

7. The system of claim 1, wherein the department is one of a plurality of departments having individual items and individual department-specific POS stations in the venue, wherein the sensing units sense and track movement of the target associated with each item from each department, and wherein the host server is operatively connected to each department-specific POS station, for generating the alert when the sensing units sense that the target associated with each item has bypassed each department-specific POS station without the transaction having been completed for each item at each department-specific POS station.

8. The system of claim 1, wherein the department is bounded by at least one of a physical wall and a virtual electronic barrier.

9. A system for deterring theft of an item associated with a radio frequency (RF) identification (RFID) tag from a department of a venue having a department-specific, point-of-sale (POS) station for completing a transaction of the item prior to authorized removal of the item from the department, the system comprising:
 a plurality of sensing units deployed overhead at the venue, each sensing unit including an RFID tag reader assembly for sensing and tracking movement of a tag associated with the item from the department; and
 a host server including a memory, the memory storing a map of the venue, the map including a location and a boundary of each a plurality of departments,
 the host server operatively connected to the department-specific POS station and the sensing units, for generating an alert when the sensing units sense and track that the tag associated with the item has bypassed the department-specific POS station by passing through the boundary of the department without the transaction having been completed for the item at the department-specific POS station.

10. The system of claim 9, wherein the host server is operative for wirelessly transmitting the alert to a wireless receiver monitored by security personnel authorized to execute a theft-deterrent action.

* * * * *